(12) United States Patent
Horesh et al.

(10) Patent No.: US 11,599,829 B2
(45) Date of Patent: Mar. 7, 2023

(54) FREE-FORM INTEGRATION OF MACHINE LEARNING MODEL PRIMITIVES

(71) Applicant: International Business Machines Corporation, Armonk, NY (US)

(72) Inventors: Lior Horesh, North Salem, NY (US); Giacomo Nannicini, New York, NY (US); Oktay Gunluk, New York, NY (US); Sanjeeb Dash, Croton on Hudson, NY (US); Parikshit Ram, Atlanta, GA (US); Alexander Gray, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 16/861,671

(22) Filed: Apr. 29, 2020

(65) Prior Publication Data
US 2021/0342732 A1 Nov. 4, 2021

(51) Int. Cl.
| | | |
|---|---|---|
| G06N 20/00 | (2019.01) | |
| G06F 17/10 | (2006.01) | |
| G06F 7/575 | (2006.01) | |
| G06F 17/00 | (2019.01) | |
| G06N 5/046 | (2023.01) | |
| G06N 5/00 | (2023.01) | |

(52) U.S. Cl.
CPC ............ G06N 20/00 (2019.01); G06F 7/575 (2013.01); G06F 17/00 (2013.01); G06F 17/10 (2013.01); G06N 5/003 (2013.01); G06N 5/046 (2013.01)

(58) Field of Classification Search
CPC .................................................. G06N 20/00
USPC ............................................................ 706/12
See application file for complete search history.

(56) References Cited

U.S. PATENT DOCUMENTS

| | | | |
|---|---|---|---|
| 7,664,723 B2 | 1/2010 | Langworthy | |
| 8,943,113 B2 | 1/2015 | Yi | |
| 9,047,267 B2 | 6/2015 | Xie et al. | |
| 10,001,920 B2 | 6/2018 | Feigenbaum et al. | |
| 10,366,335 B2 | 7/2019 | Schmidt | |
| 10,402,512 B2 | 9/2019 | Jou et al. | |
| 2007/0208548 A1* | 9/2007 | McConaghy | ......... G06F 30/367 703/2 |
| 2016/0070784 A1 | 3/2016 | Hu et al. | |
| 2018/0357207 A1 | 12/2018 | Yi et al. | |

(Continued)

OTHER PUBLICATIONS

Sotto, et al.; "A Probabilistic Linear Genetic Programming With Stochastic Context-Free Grammar Problems for solving Symbolic Regression problems", GECCO '17, arXiv:1704.00828v1, Apr. 3, 2017, 8 pages.

(Continued)

*Primary Examiner* — Eric D Lee
(74) *Attorney, Agent, or Firm* — Scully, Scott, Murphy & Presser, P.C.; Anthony R. Curro (57) ABSTRACT

A processor may include a set of primitive operators, receive a set of data-driven operators, at least one of the set of data-driven operators including a machine learning model, and receive an input-output data pair set. Based on a grammar specifying rules for linking the set of primitive operators and the set of data-driven operators, the processor may search among the set of primitive operators and the set of data-driven operators to find a symbolic model that fits the input-output data set.

20 Claims, 6 Drawing Sheets

(56) References Cited

U.S. PATENT DOCUMENTS

2019/0005390 A1  1/2019  Stitt et al.
2019/0188236 A1  6/2019  Horesh et al.
2019/0188256 A1  6/2019  Gunawan et al.
2019/0197079 A1  6/2019  Horesh et al.

OTHER PUBLICATIONS

Chen, et al.; "Elite Bases Regression: A Real-time Algorithm For Symbolic Regression", arXiv:1704.07313v2, May 15, 2017, 8 pages.
Bruneton, et al.; "Exploration and Exploitation in Symbolic Regression Using Quality-Diversity and Evolutionary Strategies Algorithms", arXiv:1906.03959v1, Jun. 10, 2019, 11 pages.
Rad, et al.; "GP-RVM: Genetic Programing-based Symbolic Regression Using Relevance Vector Machine", aXiv:1806.02502v3, Aug. 26, 2018, 8 pages.
Arabshahi, et al.; "Combining symbolic expressions and black-box function evaluations in neural programs," Published as a conference paper at ICLR 2018, arXiv:1801.04342v3, Apr. 26, 2018, 12 pages.
Selsam et al.; Developing Bug-Free Machine Learning Systems With Formal Mathematics, Proceedings of the 34th International Conference on Machine Learning, Jun. 2017, 10 pages.
Gray et al.; Automatic Derivation of Statistical Algorithms: The EM Family and Beyond, S. Becker, S. Thrun, K. Obermayer (Eds ), Advances in Neural Information Processing Systems (NIPS) 15 (Dec. 2002), 8 pages.
Udrescu et al.; "AI Feynman: a Physics-Inspired Method for Symbolic Regression," https://arxiv.org/abs/1905.11481.pdf, May 27, 2019, 14 pages.
Tawarmalani et al.; "Apolyhedral branch-and-cut approach to global optimization", Mathematical Programming, Received Jun. 19, 2004, Accepted Nov. 19, 2004, Published online May 3, 2005, pp. 225-249, Ser. B 103.
Belotti et al;. "Branching and bounds tightening techniques for non-convex MINLP," Optimization Methods and Software, Oct. 2009, 45 pages.
Maher et al.; "The SCIP Optimization Suite 4.0.", ZIB Report 17-12, Mar. 9, 2017, 83 pages.
Wikippedia. "A* search Algorithm", https://en.wikipedia.org/wiki/A*_search_algorithm, Last edited on Apr. 28, 2020, Accessed on Apr. 28, 2020, 8 pages.

* cited by examiner

FREE-FORM INTEGRATION OF MACHINE LEARNING MODEL PRIMITIVES

BACKGROUND

The present application relates generally to computers and computer applications, and more particularly to artificial intelligence, machine learning, and constructing a symbolic model, which can include a machine learning model and/or training a machine learning model such as a neural network, which for example, can be coupled with a physical system to control the physical system.

Machine learning is a branch of artificial intelligence, which enables a computer, device or machine to learn and make autonomous decisions, for example, without human intervention or least amount of human intervention. Machine learning can allow a computer to automatically or autonomously improve itself, for example, self-learn through experience in performing a task. An example of machine learning includes, but is not limited to, neural networks and training such neural networks. Various different algorithms of machine learning and neural networks exist. Free-form symbolic discovery relies on inference of both model functional form and its parametrization. Given a training dataset with features and targets (e.g., input-output data pairs), symbolic regression finds a symbolic function that predicts the target given the features. Most free-form model discovery such as symbolic regression approaches are based upon imperative synthesis formulation. Alternatively, it is possible to consider a declarative formulation, in which a symbolic model constitutes a valid phraseable sentence in a formal language including operators, variables and coefficients. In such formulation, a search in the space of sentences (mathematical expressions) can be performed. Yet, the utility of such approaches is limited to simple mathematical expressions, for example, expression only containing mathematical primitives.

BRIEF SUMMARY

A computer-implemented method, in one aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The method can also include defining the grammar specifying the rules for linking the set of primitive operators and the set of data-driven operators.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The set of primitive operators can include mathematical operators, logical operators and functions.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The method can also include training a data-driven operator, for example, at least one of the data-driven operators.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The searching can be performed by a constrained optimization search with at least one predefined objective.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The searching can be performed by a constrained optimization search with at least one predefined objective. The predefined objective can include a predefined accuracy objective.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The searching can be performed by a constrained optimization search with at least one predefined objective. The predefined objective can include a predefined expression simplicity objective.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The searching can be performed by a constrained optimization search with at least one predefined objective. The predefined objective can include a fidelity measure.

A computer-implemented method, in another aspect, can include receiving a set of primitive operators. The method can also include receiving a set of data-driven operators, at least one of the set of data-driven operators including a machine learning model. The method can also include receiving an input-output data pair set. The method can also include, based on a grammar specifying rules for linking the set of primitive operators and the set of data-driven operators, searching among the set of primitive operators and the set of data-driven operators to find a symbolic model that fits the input-output data set. The searching can be performed by a constrained optimization search with at least one predefined objective. The predefined objective can include an application specific constraint.

A system, in one aspect, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set.

A system, in another, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set. The set of primitive operators can include mathematical operators, logical operators, and functions.

A system, in another, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set. The hardware processor can also be configured to train a data-driven operator of the data-driven operators.

A system, in another, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set. The hardware processor can also be configured to perform searching by a constrained optimization search with at least one predefined objective.

A system, in another, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set. The hardware processor can also be configured to perform searching by a constrained optimization search with at least one predefined objective. The predefined objective can include a predefined accuracy objective.

A system, in another, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set. The hardware processor can also be configured to perform searching by a constrained optimization search with at least one predefined objective. The predefined objective can include a predefined expression simplicity objective.

A system, in another, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set. The hardware processor can also be configured to perform searching by a constrained optimization search with at least one predefined objective. The predefined objective can include a fidelity measure.

A system, in another, can include a hardware processor and a memory device coupled with the hardware processor. The hardware processor can be configured to receive a set of primitive operators. The hardware processor can also be configured to receive a set of data-driven operators, at least one of the set of data-driven operators including a machine learning model. The hardware processor can also be configured to receive an input-output data pair set. The hardware processor can also be configured to, based on a grammar specifying rules for linking the set of primitive operators and the set of data-driven operators, search among the set of primitive operators and the set of data-driven operators to find a symbolic model that fits the input-output data set. The hardware processor can also be configured to perform searching by a constrained optimization search with at least one predefined objective. The predefined objective can include an application specific constraint.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In embodiments, systems, methods and techniques may be provided which can integrate free-form model primitives. Model primitives can include data-driven models such as machine learning models, mathematical expressions or logical operations. For example, given an input-output data pair, a system can automatically derive a symbolic expression, which can include a combination of one or more of mathematical expressions, logical statements and data-driven models such as machine learning models. In an embodiment, the system may search in the space of sentences such as mathematical expressions, logical statements and data-driven models for a model that meets one or more objectives such as one that minimizes a measure of complexity while adhering to fidelity error bound.

In an embodiment, the set of operators can include data-driven models such as an artificial neural network, support vector machine (SVM), Gaussian mixture model (GMM), deep neural network (DNN), K-nearest neighbor (KNN), hidden Markov model (HMM), gradient boosting tree (GBT) and Markov decision tree, and/or others, as well as elementary operator primitives, such as '+', '−', '*', simple functions, or logical operators, such as existential, negation, conjunction, implication, disjunction and conditional. In an embodiment, one or more machine learning models are considered as part of the symbolic expression, for example, for a given input-output data pair.

In an aspect, a larger set of operators increases the modeling power of the language over which the system optimizes. The final model may include a combination of explicit mathematical formulas, logical statements and data-driven models. The extension to data-driven models and their combinations may be possible by virtue of the fact that these models are also mathematically representable expressions that originate from the data, hence they can, in principle, be constructed as part of the language through the available symbols. In an embodiment, as a way to reduce the computational burden, the system may train the data-driven models as a first step of the optimization procedure, leaving to the optimization model only the task of combining them in a meaningful way. In an embodiment, for a single symbolic expression with multiple data-driven models, the system may train the data-driven models in a round-robin manner.

Figure 1:
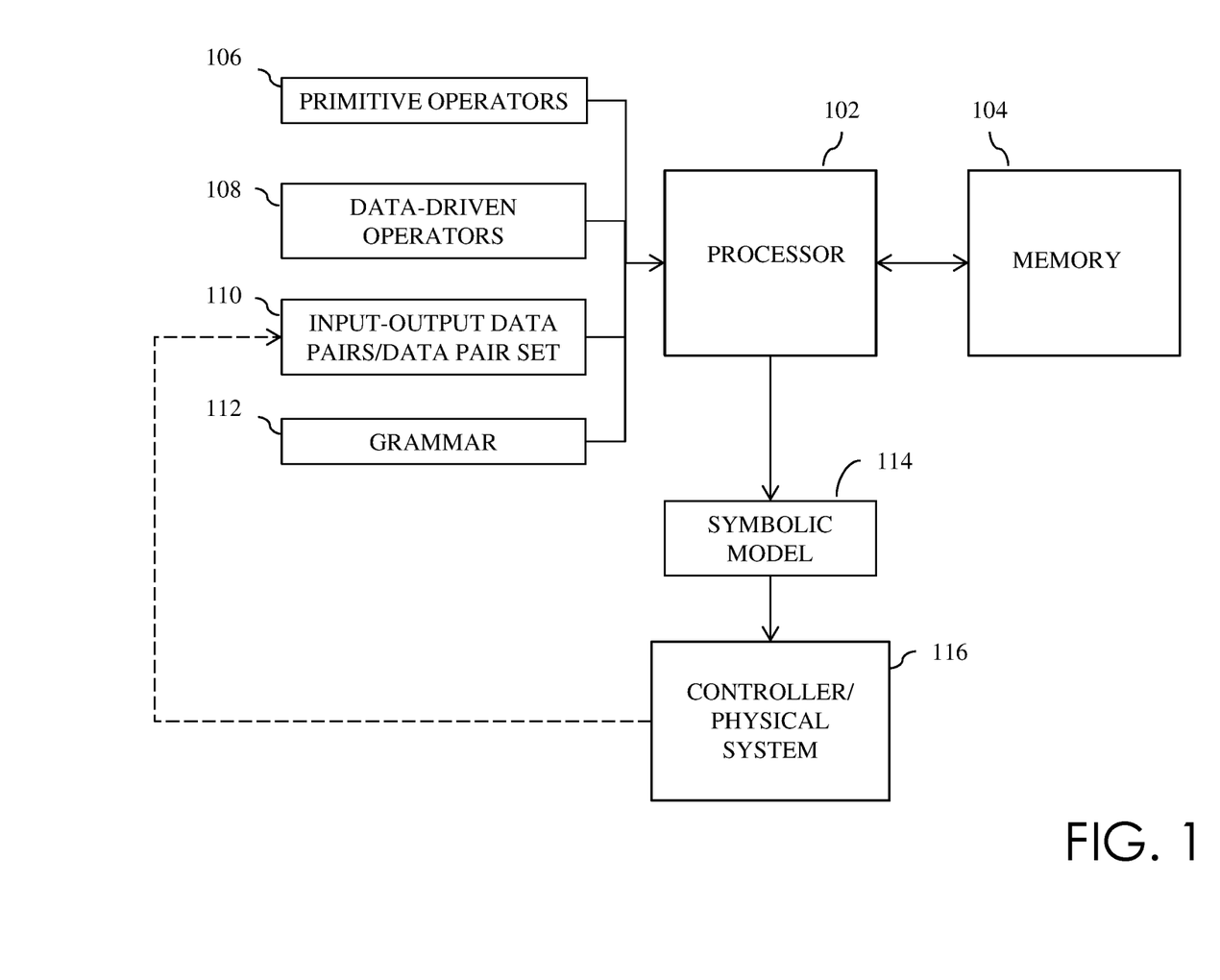
FIG. 1 is a diagram illustrating a system in one embodiment.

FIG. 1 is a diagram illustrating a system in one embodiment. The system can include computer-implemented components, for instance, implemented and/or run on one or more hardware processors 102, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices 104 may be configured to selectively store instructions executable by one or more hardware processors 102.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

The system can implement free-form integration of data-driven model primitives, also referred to as abstract model primitives. The processor 102 receives a set of primitive operators 106 such as mathematical operators or logical operators. Examples of primitive operators 106 can include, but are not limited to, '+', '−', '/', 'log', 'exp', conjunction, disjunction, negation, implication. The processor 102 receives a set of data-driven operators 108 such as machine learning models. Examples of data-driven operators can include, but are not limited to, artificial neural network, Support Vector Machine (SVM), deep neural network (DNN), Gaussian mixture model (GMM), hidden Markov model (HMM), Markov decision trees, and/or others.

The processor 102 receives one or more input-output data pairs 110, the data may correspond to physical experiment, for example, as in discovery of a mathematical model of a physical system, a process, or input and output of a computer program. An input-output data pair contains input data and corresponding output data. In an example embodiment, an input-output data can be data associated with a manufacturing process or system. For example, input data can include quantities or compositions of materials used to manufacture a product, and corresponding output data can include the quality of the product manufactured based on the quantities or compositions of materials. Another example of input data can include operating conditions of the manufacturing process such as the pressure, temperature, timing, various equipment settings and other operating conditions. Corresponding output data can include the quality of the product manufactured based on such operating conditions. Multiple of input-output data pairs specifying different input and output can be received.

Grammar rules 112 can be defined and received. The grammar rules 112 define permitted expressions of the primitive operators and the data-driven operators. Examples of the grammar rules 112 are further described below.

The processor 102 performs a constrained optimization search for a model 114 whose evaluation at the input data compared to the output values meets at least one predefined objective, for example, whose evaluation at the input data compared to the output values is bounded by a predefined upper bound (also referred to as a fidelity measure) and its complexity is minimal (also referred to as a simplicity objective). In an embodiment, the constrained optimization search allows the system to additionally incorporate various objectives and user constraints inherently without requiring any major changes to the system's processing.

Referring to the input-output data pairs associated with a manufacturing process or system described above, the resulting symbolic model 114 expresses or models the relationship between the input data and the output data, for example, the relationship between the quantities or compositions of materials used for manufacturing the product and/or operating conditions such as the pressure, temperature, various equipment settings involved in the manufacturing of the product (as examples of input data) and the product quality of the end product produced (as an example of output data). The product quality, for example, can be measured by various desired characteristics of the end product, e.g., robustness, malleability, flexibility, smoothness, roughness, and/or other characteristics depending on what end product is being produced.

The generated symbolic model 114, which for example, is optimized based on specified constraints, can be run or used to predict an output given an input. For example, given an input data specifying conditions of a manufacturing system, the symbolic model 114 can predict corresponding quality of a product produced under those conditions. In an embodiment, the generated symbolic model 114 can be linked to or coupled with a physical system 116 such as the above-described manufacturing system by way of example. The symbolic model 114 can be run iteratively with various different input data (e.g., various different conditions) for the symbolic model 114 to output corresponding product qualities. Responsive to a product quality meeting a desired level (e.g., a threshold level which can be defined), the physical system 116 can be automatically controlled to use the specified input (e.g., operating condition) that produced the desired output (desired quality level). For instance, a signal can be transmitted to the physical system 116 with the specified input (e.g., specific operating conditions such as the pressure, temperature, other equipment settings) as data transmission or packet to the physical system 116 or a controller of the physical system 116 to actuate the physical system's equipment to set the physical system's operating conditions to that of the specified input that produced the desired product quality. In turn, the actual data produced by the physical system 116 (e.g., input and corresponding output) can be further used as input output data pairs in refining or regenerating the symbolic model 114.

Another example of input output data can include data associated with computer system performance and/or computer network performance. Input data can include available resources such as network bandwidth, number of processors, number of cores, number of hardware threads, amount of memory, type of memory device, and/or others. Output data can be performance data corresponding to a computer system's or network's performance given the resources specified in the input data. The generated symbolic model 114 can be linked or coupled with a computer system or network. The generated symbolic model 114 can be run using different input data, for example, different configurations of resources, and can predict different corresponding performance data. Based on predicted performance data meeting a desired level (e.g., a threshold level which can be predefined), the computer system or network can be controlled to automatically change its configuration of resources to those specified in the input data (which resulted in the symbolic model 114 predicting the desired performance).

Yet in another example, input data can include information about an automobile's engine specification, power, weight, make, model, year and others, and the output can include the automobile's mileage per gallon of fuel (MPG).

Still in another example, input data can include information about the activity, evolution, number of spots and other observational statistics in a particular area on the sun's surface over the last 24 hours and the output can include the number of severe flares in that area over the last 24 hours, In yet further example, input data can include information about a particular beverage's physicochemical characteristics such as acidity, chlorides concentration, density, pH value, other content, and the output can include the quality score for the beverage based on sensory data.

Other examples of input output data abound and are not limited to only those described in the above examples. A symbolic model 114 generated or modeled based on input output data pairs associated with a physical system and/or process can further be used to control that physical system and/or process.

During the optimization process to search for the symbolic expression, the processor 102 can try and evaluate multiple symbolic expressions. To evaluate the quality (for example, fidelity) of the expression, the data-driven operators and/or models can be trained for their respective input-output pairs.

In an embodiment, the precise training data for any data-driven model (in an expression) can depend on preceding and succeeding operations in the expression to the model. For example, with the expression $y=pow(x_3, (SVM(log(x_1), x_2+x_4)))$, the data-driven model SVM (support-vector machine) can be trained with an input-output pair where the input is $(log(x_1), x_2+x_4)$, the output is $(log(y)/log(x_3))$, and $x_1, x_2, x_3, x_4$ are the covariates of the original input data and y is the original output data.

For expressions with multiple data-driven models, there may be interdependencies between the data-driven models (based on their location in the expression). In this case, during the evaluation of the quality of the expression, the processor 102 may train the data-driven models in a round-robin way where the processor 102 trains each data-driven model with its corresponding input-output pairs while fixing all other data-driven models in the expression, and repeats this process until some form of convergence is reached at the expression level across all data-driven models. For example, with an expression $y=pow(x_3, (SVM(log(x_1), GBT(x_2+x_4, x_1))))$, the GBT (gradient boosted decision trees) parameters can be trained with input $(x_2+x_4, x_1)$ and output y, and then SVM can be trained with the GBT parameters fixed with input $(log(x_1), GBT(x_2+x_4, x_1))$ and output $(log(y)/log(x_3))$. In the next round, the processor 102 can fix the SVM parameters, and train the GBT with input $(x_2+x_4, x_1)$ for an output y' such that the difference between $(log(y)/log(x_3))$ and $SVM(log(x_1), y')$ is minimized. The processor 102 can continue this round-robin process until the model parameters of SVM and GBT stop changing (up to some tolerance, e.g., a predefined tolerance value).

In an embodiment, one or more data-driven models can be pre-trained with the original input-output data pairs. The pre-trained data-driven models can be utilized in the expression. Pre-training may lessen or reduce the computational cost of the training of the data-driven models during an optimization search. In this case, the evaluation of any expression does not require training of the data-driven operators. However, this may come at some cost on the qualities of the expressions.

Figure 2:
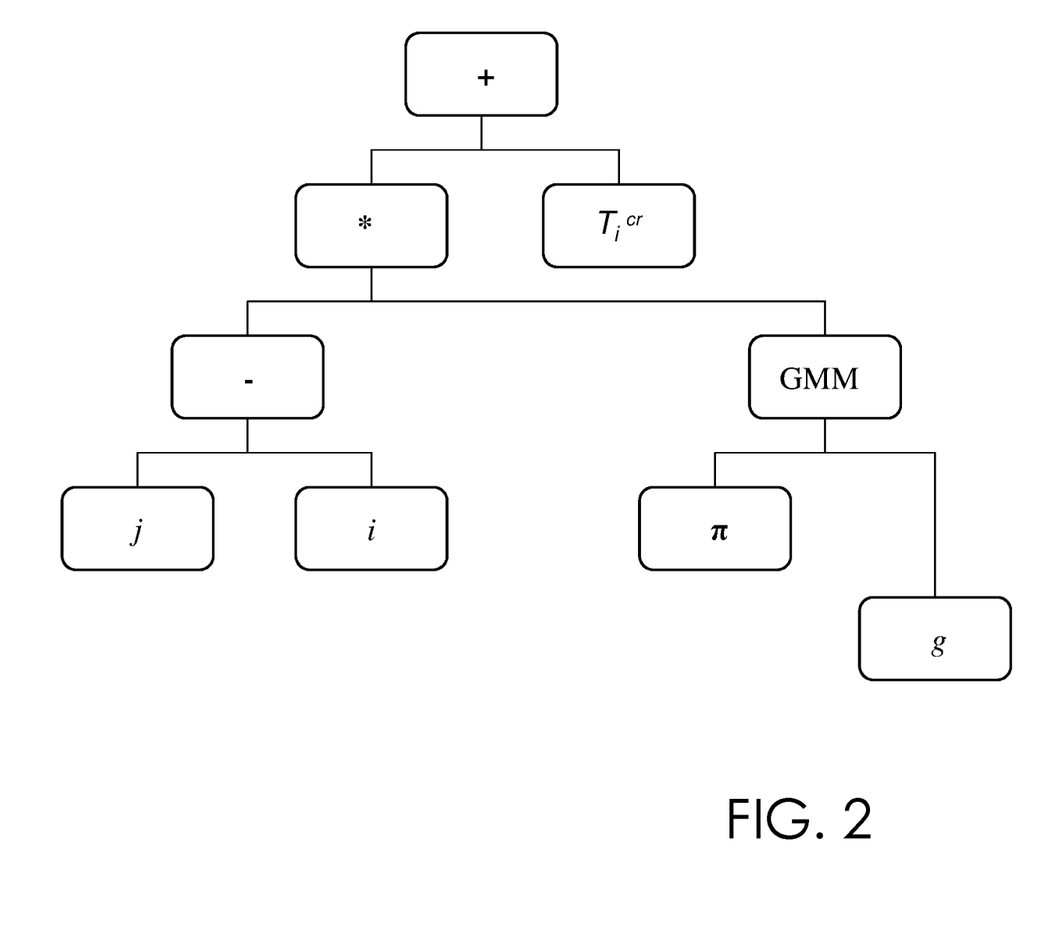
FIG. 2 shows an integrated model example in an embodiment.

FIG. 2 shows an integrated model example in an embodiment. The model includes a symbolic expression which is a combination of primitive operators (e.g., +, *, −), input covariates (e.g., $t_i^{cr}$, which is the $i^{th}$ crossing time of a pendulum), data-driven operator (e.g., Gaussian Mixture Model GMM), and constant values (e.g., j, i, g (a physical constant such as gravity)). The input-output data pairs corresponding to this expression comes from a physical experiment to derive the dependence between the length and the period of a pendulum. For example, an output symbolic model shown at 114 can include an integrated symbolic model shown in FIG. 2.

Figure 3:
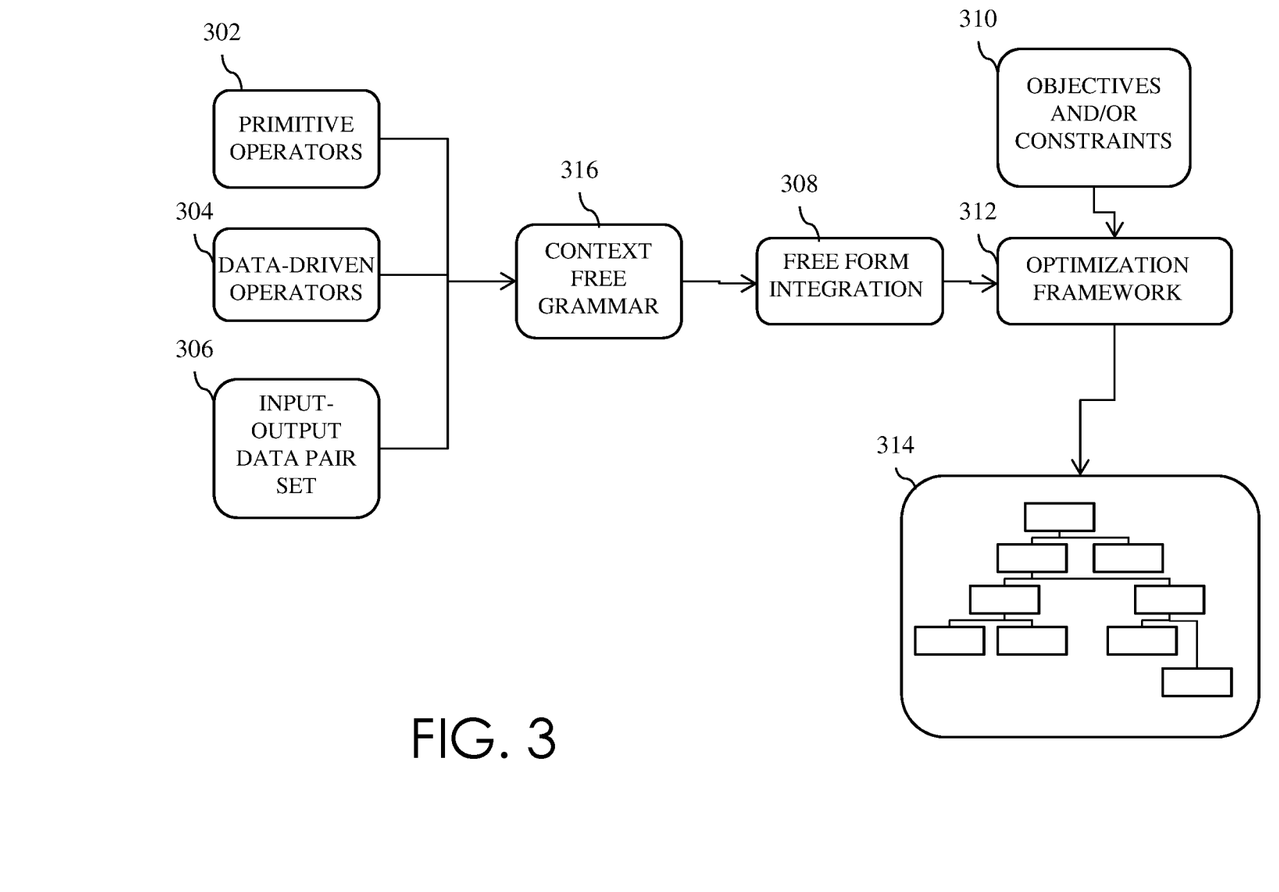
FIG. 3 is a diagram illustrating components of a system in an embodiment.

FIG. 3 is a diagram illustrating components of a system in an embodiment. The components can include computer-implemented components as described above with reference to FIG. 1. For example, one or more components can run on or executed by one or more hardware processors, which may include components such as programmable logic devices, microcontrollers, memory devices, and/or other hardware components, which may be configured to perform respective tasks described in the present disclosure. Free form integration 308 defines and/or explores an expression space including various combinations of expressions formed using one or more of received primitive operators 302 and data-driven operators 304 according to a context free grammar 316. Free form integration may employ techniques such as breadth first search, branch and cut, and/or another technique to explore various combinations. The various combinations of expressions explored would fit a given input-output data pair 306. An optimization framework 312 finds or solves for an optimal expression, which fits the given input-output data pair 306, given one or more objectives and/or constraints 310. Examples of objective and/or constraints 310 can include a degree of fidelity measure specifying how close the output should be to the actual or real output; expression complexity (which can also be specified in terms of expression simplicity) specifying how simple or complex the expression can be (e.g., the number of terms used in the expression), and application specific objectives and/or constraints (e.g., monotonically increasing functional expression).

Examples of the primitive operators 302 can include mathematical operators such as addition ('+'), subtraction ('−'), multiplication ('*'), division ('/'), logarithmic function (e.g., 'log', 'ln'), exponential function (e.g., 'exp'), and/or other mathematical operators, logical operators, such as conjunction, disjunction, implication, negation, conditional, and physical constants such as gravity, Planck's constant, Avogadro constant, other physical constants, and/or other constant values.

Examples of data-driven operators 304 can include one or more machine learning models such as, but not limited to, an artificial neural network, deep learning neural network, and decision tree ensemble. In an embodiment, one or more of the data-driven operators 304 can be pre-trained models. For example, a machine learning model such as a neural network model may be trained or pre-trained and used in exploring expression space. For example, one or more of the data-driven operators 304 may be trained or pre-trained based on historical data, for instance, corresponding to, or similar to, the received input-output data pair. In another embodiment, one or more of the data-driven operators 304 such as a neural network model can be trained while exploring the expression space, which would fit the input-output data pair 306. For instance, parameters such as weights and biases can be determined during the free form integrations and/or optimization process. Example training of a data-driven operator in an expression is described above with reference to FIG. 1. In an embodiment, operators within a symbolic regression have data-driven tunable and trainable parameters.

Input-output data pair 306 can represent a model of a physical system such as a manufacturing system or another system, a process, and/or input and output of a computer program.

Optimization framework 312 may employ or implement mixed integer programming and/or non-linear programming, e.g., bound by computation efficiency, to solve for an optimal expression or formula that fits the input-output data pair. The formula can include primitive operators and/or data-driven operators, for instance, a combination of one or more primitive operators and one or more data-driven operators. In another aspect, the formula can include a combination of data-driven operators. The formula can include any other combinations. A solution of the optimization framework 312 may be output as a formula or expression 314. In an aspect, a graphical symbol of the formula 314 can be presented or caused to be displayed on a user interface.

In an embodiment, the context free grammar 316 links machine learning operators, data and mathematical operators. The following describes examples of context free grammar in an embodiment. Expressions within triangular brackets ('<exp>') represent symbols in grammar. Double colon equal ('::=') represents a production sign. <term> represents a terminal. <op> represents operators. <unop> represents a unary mathematical operator. <binop> represents a binary mathematical operator. <abop> represents a data-driven operator such as machine learning models. Examples of <abop> can include, but not limited to, SVM, DNN, GBT (e.g., gradient boosting), KNNC (e.g., K-nearest neighbor). <constant> represents a constant value. <invar> represents input variable.

<exp>::=<term>|(<exp>)|<exp><op><exp>;
<exp>::=<unop>(<exp>)|<binop>(<exp>, <exp>);
<exp>:=<abop>(<exp>{, <exp>}$^+$);
<term>::=<constant>|<invar>
<op>::=<mathop>|<logicalop>
<mathop>::=+|−|×|÷
<logicalop>:=conjunction|disjunction|implication|conditional
<unop>::=exp|log|σ|$\sqrt{\phantom{x}}$|$\sqrt[x]{\phantom{x}}$|existential negation
<binop>::=pow (e.g., power)
<abop>::=<svm>|<dnn>|gbt>|<knnc>

<constant>::=any number|any physical constant
<invar>::=any input variable.

The grammar expression, (<exp>), <exp><op><exp>, <op> can allow for a symbolic expression of arbitrary length, which can include mathematical primitives, logical operators and abstract operators.

The grammar expressions, <constant> and <invar> can contain scalars, physical constants, and system covariates, e.g., any scalar coefficient g, c, h $c_0$, e, kB, NA, . . . .

For example:
<term>::=any number (e.g., any scalar coefficient);
<term>::=any physical constant (e.g., g, c, h, $\varepsilon_0$, e, $k_B$, $N_A$, . . . )
<invar>::=any input variable (e.g., covariate $x_i$).
   <abop>(<exp>{, <exp>}*), where
<abop>::=<svm>|<dnn>|gbt>|<knnc> show an example of defining data-driven primitives such as machine learning models. Machine learning models can be applied to a set of expressions as covariates (<exp>{, <exp>}*), e.g., as in <abop>(<exp>{, <exp>}*).

The grammar can have conditions associated with it, for example, for correctness. Table 1 below shows examples of productions rules and corresponding conditions in an embodiment.

TABLE 1

| Production rule | Condition |
|---|---|
| <exp> ::= <exp>$_1$ ÷ <exp>$_2$ | Value (<exp>$_2$) ≠ 0 |
| <exp> ::= log (<exp>$_1$) | Value (<exp>$_1$) > 0 |
| <exp> ::= $\sqrt{(<exp>_1)}$ | Value (<exp>$_1$) ≥ 0 |
| <exp> ::= pow (<exp>$_1$, <exp>$_2$) | Value (<exp>$_1$) > 0 OR Value (<exp>$_2$) ∈ ℤ |

The context free grammar in an embodiment is able to concretely define a bridge between different machine learning functionality, different forms of input and output, defining a new "language" where a "sentence" can be an expression containing primitive and data-driven operators. An optimization framework can incorporate this context free grammar and accommodate computational complexity, and perform symbolic regression in a nonconventional machine learning pipeline space.

The systems and methods in an aspect can take into consideration context-free grammar, symbolic regression, machine learning models and transformations and various underlying objectives such as prediction performance and/or expression complexity.

Figure 4:
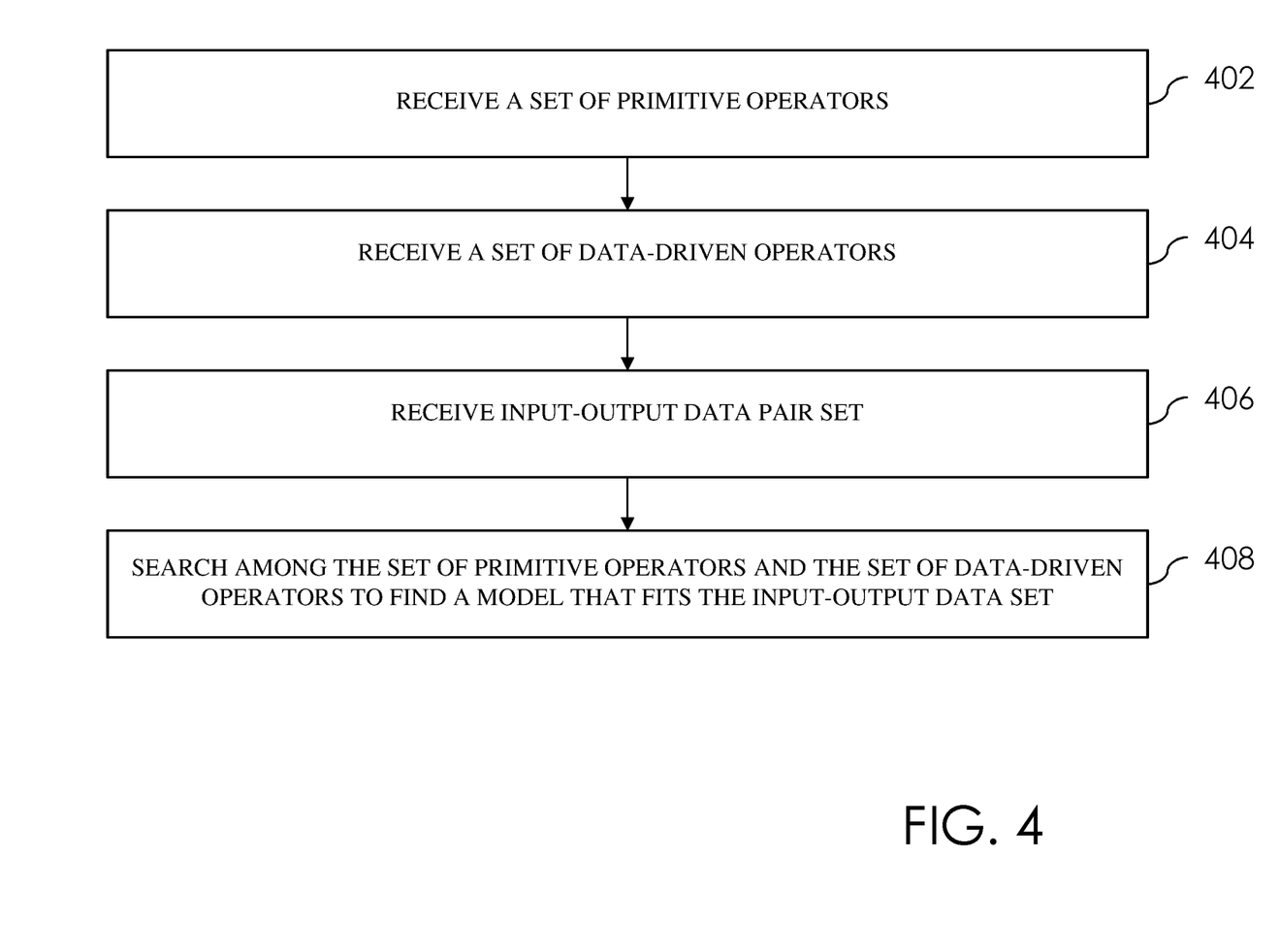
FIG. 4 is a flow diagram illustrating a method in one embodiment.

FIG. 4 is a flow diagram illustrating a method in one embodiment. The method can integrate free-form data-driven model primitives or operators. The method can be performed by one or more processors or hardware processors, for instance, as described with reference to FIG. 1. At 402, a set of primitive operators is received. Examples of primitive operators can include mathematical operators, logical operators and functions. For example, a set of primitive operators can be defined and input. For instance, a default set of primitive operators can be defined and stored in a data file, which can be retrieved, read and used as input by a processor or hardware processor. As another example, a user may input a desired set of primitive operators.

At 404, a set of data-driven operators is received. In an embodiment, the data-driven operators include one or more machine learning models. Examples of data-driven operators include, but are not limited to, artificial neural network, SVM, DNN, GBT (e.g., gradient boosting tree), KNNC (e.g., K-nearest neighbor), Gaussian mixture model (GMM), deep neural network (DNN), K-nearest neighbor (KNN), hidden Markov model (HMM), and Markov decision tree, and/or others. Data-driven operators can include any data-driven machine learning or data-science operator.

In an embodiment, the method may also include training one or more of the data-driven operators, e.g., one or more machine learning models, e.g., using historical data. For instance, the historical data with which one or more of the data-driven operators can be trained can include data associated with (or describing) the same or similar system or process, with which the input-output data pair (received at 406) is associated.

For example, for any given input-output pairs $((X_1, y_1), \ldots, (X_n, y_n))$, where $X_i$ is the $i^{th}$ set of input covariates (the $i^{th}$ input) and $y_i$ is the output corresponding to the $i^{th}$ input, the data-driven operators and/or models may be trained or pre-trained on these input-output pairs. The training involves minimizing the appropriate notion of loss. Data-driven operators are examples of abstract operators. Abstract operators are not limited only to data-driven operators. This pre-training can also be done with data from the same or similar system with the same or corresponding set of input covariates.

Given these pre-trained data-driven operators, the optimization in the symbolic regression may search over expressions where any selected pre-trained data-driven operator has the appropriate set of inputs, and during this optimization, the internal parameters for the abstract data-driven operators can be fixed.

In another embodiment, one or more of the data-driven operators can be trained while searching for a symbolic model that fits the input-output data pair set. For example, different machine learning model architectures including different hyperparameters and parameters can be utilized.

Abstract operators can include data-driven operators such as machine learning (ML) operators. Abstract operators can have different types of parameters defining an operator. For example, the hyper-parameters define the class of functions being considered; the precise operator parameters learned from the data (input-output pairs) define the function in the class of functions (defined by the hyper-parameters) by minimizing an appropriate objective.

In an embodiment, in which pre-trained abstract operators are considered, the methodology can select hyper-parameters that minimize a relevant objective using a derivative free optimization technique. Examples of derivative free optimization techniques can include, but are not limited to, Bayesian Optimization and Trust-Region based Derivative-Free Optimization. Then the methodology can fix the hyper-parameters and the operator parameters in the pre-trained abstract operators, and use them in the symbolic expressions generated during the optimization.

In an embodiment, in which pre-trained abstract operators are not considered, the methodology can train the abstract operators for fixed hyper-parameters, for example, for each expression they appear in during the optimization, for instance, as described above with reference to FIG. 1. For all the abstract operators in any given expression, the methodology can optimize for their hyper-parameters (e.g., using derivative-free methods if needed) to minimize the overall appropriate objective for the expression being considered.

At 406, an input-output data pair set is received. The input-output data pair can be data associated with (or describing) a physical system or process, e.g., a manufacturing system, data associated with a computer system behavior, computer program, and/or another. For example, the input-output pairs can correspond to any statistical, machine learning and/or data science data associated with a real-world problem.

At 408, based on a grammar specifying rules for linking the set of primitive operators and the set of data-driven operators, search is performed among the set of primitive operators and the set of data-driven operators to find or construct a symbolic model that fits the input-output data set. In an aspect, the symbolic model that fits the input-output data, which is identified or found in the search, can contain no data-driven operators.

For example, the grammar can be defined and provided, which links the set of primitive operators and the set of data-driven operators, providing rules for permissible linking. The grammar in an embodiment is a context-free grammar providing a set of production rules that describe all possible expressions or symbols in free-form integration of operators. Examples of the grammar are described above.

The search can include finding various combinations of operators in the set of primitive operators and the set of data-driven operators, for example, using breadth first search, branch and cut technique, and/or another technique, and performing an optimization subject to one or more objectives and/or constraints. Searching, for example, includes performing a constrained optimization with at least one predefined objective. A predefined objective can include one or more of accuracy objective, expression simplicity objective, and/or another objective. In another aspect, a predefined objective can include a fidelity measure and/or an application specific constraint. One or more objectives and/or constraints to the optimization can be input and can be configurable. For instance, a user may specify which objective or constraint to use in the optimization. By way of example, an optimization can include mixed integer programming, non-linear program, or another optimization technique, which solves for a symbolic expression that results in optimal solution given one or more objectives and/or constraints, which would fit the input-output data pair set. For example, the optimization solves for a symbolic expression containing a combination of primitive and data-driven operators, which fits the input-output data pair set, constrained by one or more objectives and/or constraints, such as simplicity of expression and fidelity measure. For instance, an optimization process may solve for a symbolic expression that fits the input-output data, which minimizes a measure of complexity and while constraining the fidelity to be above a threshold, for example, a user-specified threshold.

There can be various ways of searching for the symbolic expression. For example, some data-driven operators can themselves be represented with an expression containing only primitive mathematical operators. For example, a linear model can be expressed as $w_1 z_1 + w_2 z_2 + \ldots + w_k z_k$, where $w_1, \ldots, w_k$ are scalars (<constant>::=any number) and the $z_1, \ldots, z_k$ are inputs to the linear model. An L-layer neural network can be expressed as $W_L s(W_{L-1} s(W_{L-2} \ldots s(W_1 z+bi)+b_{L-2})+b_{L-1})+b_L$, where $W_1$ is a matrix of scalars, bi is a vector of scalars, s(.) is a element-wise activation function (such as logistic, hypertangent) and z is a vector of the inputs $z_1, \ldots, z_k$ to the neural network. A kernel support vector machine can also be expressed thusly.

Using a set of such data-driven operators (e.g., represented as mathematical expressions), and a defined depth of the tree induced by the context-free grammar (e.g., implicitly defining the maximum length of any expression), the optimization or search problem reduces to an explicit mixed integer nonlinear programming (MINLP) and can be solved with global optimality guarantees, e.g., using tools such as (but not limited to) off-the-shelf optimization solvers such as Convex Over and Under ENvelopes for Nonlinear Estimation (Couenne).

For data-driven operators that cannot be represented explicitly as a mathematical expression containing only primitive operators, such as decision tree ensembles (random decision forests, gradient boosted ensembles) and K-nearest-neighbor based ML methods, the methodology may employ heuristic search (e.g., A* search, which is a graph traversal and path search algorithm) on the tree induced by the context-free grammar, where every terminal node of this tree corresponds to a precise expression containing both primitive and data-driven operators, searching for the optimal terminal node corresponding to the symbolic expression that optimizes the specified objective.

Figure 5:
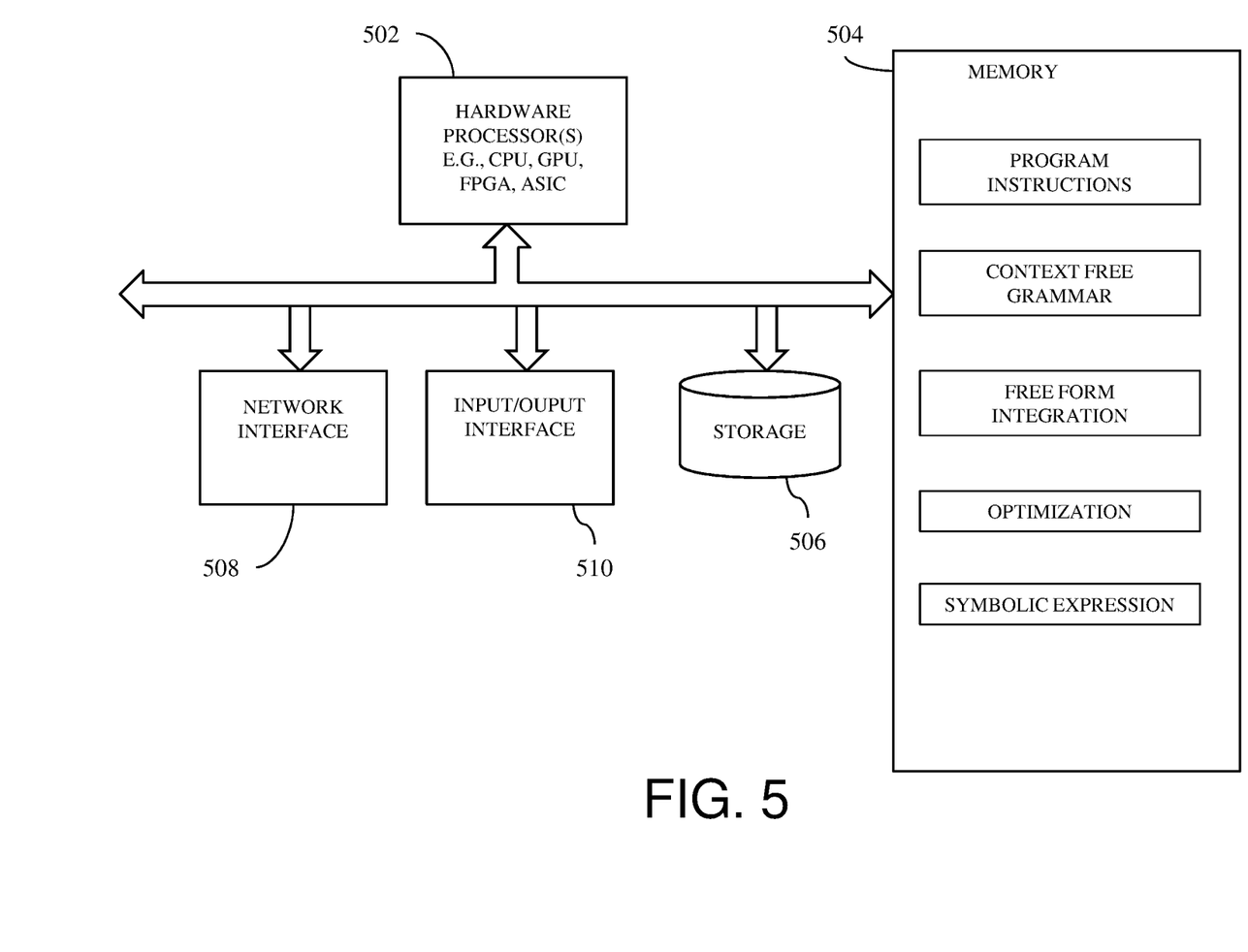
FIG. 5 is a diagram showing components of a system in one embodiment, which can provide free-form model discovery in an embodiment.

FIG. 5 is a diagram showing components of a system in one embodiment, which can provide free-form model discovery in an embodiment. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and generate a prediction model and recommend communication opportunities. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input, for example, a set of primitive operators, a set of data-driven operators, and an input-output data pair set. In an aspect, one or more hardware processors 502 may also train a data-driven operator, to use as input for search. One or more hardware processors 502 may also retrieve or receive context free grammar, which links or provides rules for linking the set of primitive operators and the set of data-driven operators. At least one hardware processor 502 may search for a model (e.g., a symbolic model) that fits the input-output data pair set, among a various combinations of the set of primitive operators and the set of data-driven operators, for example, constrained by a given or configured objective and/or constraint. Data such as the set of primitive operators, the set of data-driven operators, and the input-output data pair set, and/or the context free grammar may be stored in a storage device 506 or received via a network interface 508 from a remote device, and may be temporarily loaded into a memory device 504 for finding or constructing a symbolic model, as described above. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Advantageously, the systems, methods and techniques in embodiments can automatically derive symbolic expressions given examples of input data and corresponding output data, also referred to as input-output data pairs. The symbolic expressions can include one or more of a mathematical expression, logical operator and abstract operator such as a data-driven operator. A data-driven operator can be a pre-trained data-driven operator such as a trained machine learning model (e.g., a neural network model). A data-driven operator can be trained during the derivation of a symbolic expression, for example, in searching and/or optimization stages. In an aspect, by including abstract operators such as data-driven operators in symbolic regression via free-form integration, the systems and methods in embodiments can search for a richer set of expressions, leading to improved performance (e.g., in terms of objectives and constraints).

Figure 6:
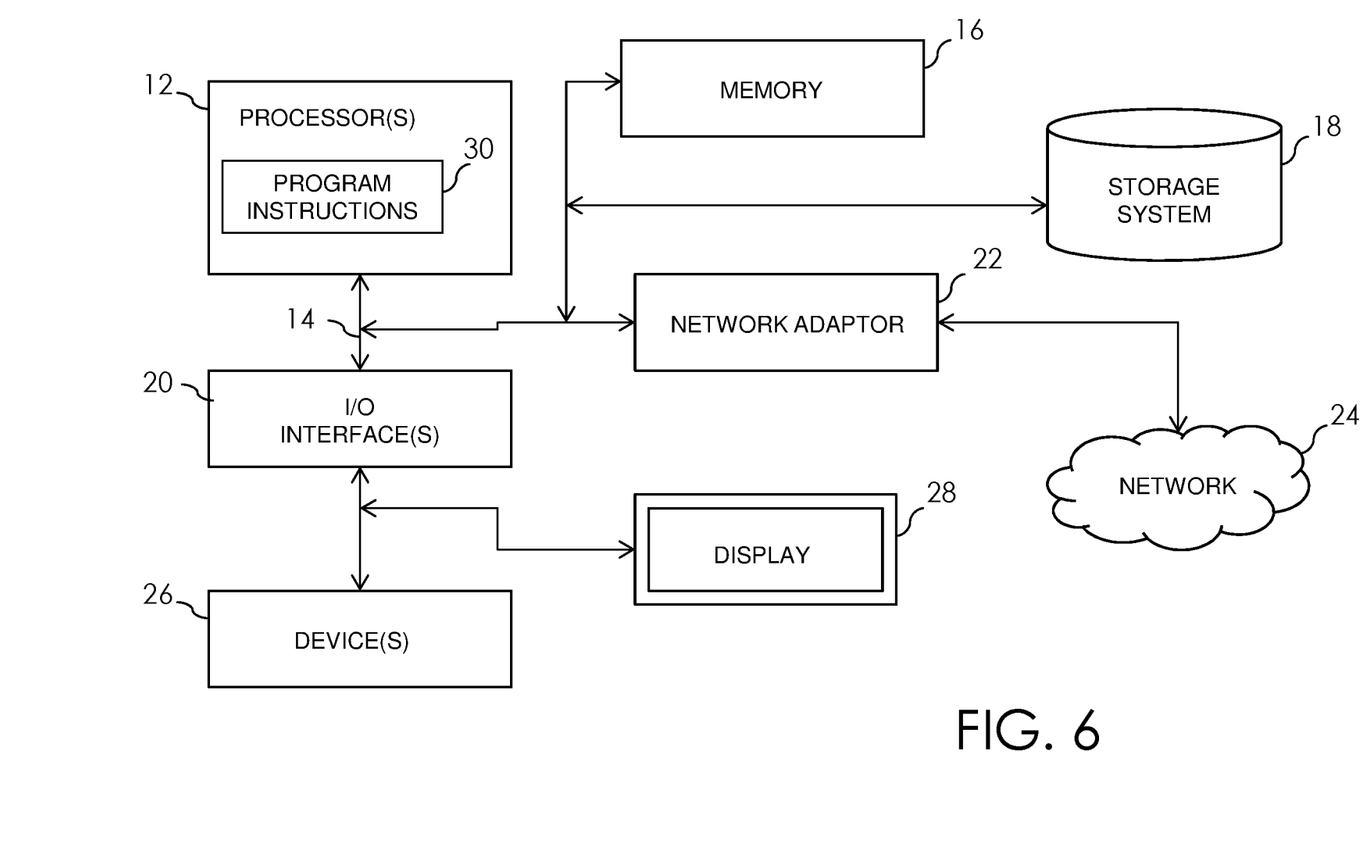
FIG. 6 illustrates a schematic of an example computer or processing system that may implement a system in one embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a set of primitive operators;
receiving a set of data-driven operators, at least one of the set of data-driven operators including a machine learning model;
receiving an input-output data pair set; and
based on a grammar specifying rules for linking the set of primitive operators and the set of data-driven operators, searching among the set of primitive operators and the set of data-driven operators to find a symbolic model that fits the input-output data pair set, the symbolic model including a combination of at least one primitive operator and at least one data-driven operator whose parameters are learned.

2. The method of claim 1, further including:
defining the grammar specifying the rules for linking the set of primitive operators and the set of data-driven operators.

3. The method of claim 1, wherein the set of primitive operators include mathematical operators, logical operators and functions.

4. The method of claim 1, further including training a data-driven operator of the data-driven operators.

5. The method of claim 1, wherein the searching is performed by a constrained optimization search with at least one predefined objective.

6. The method of claim 5, wherein the predefined objective includes a predefined accuracy objective.

7. The method of claim 5, wherein the predefined objective includes a predefined expression simplicity objective.

8. The method of claim 5, wherein the predefined objective includes a fidelity measure.

9. The method of claim 5, wherein the predefined objective includes an application specific constraint.

10. A system comprising:
a hardware processor; and
a memory device coupled with the hardware processor;
the hardware processor configured to at least:
receive a set of primitive operators;
receive a set of data-driven operators, at least one of the set of data-driven operators including a machine learning model;
receive an input-output data pair set;
based on a grammar specifying rules for linking the set of primitive operators and the set of data-driven operators, search among the set of primitive operators and the set of data-driven operators to find a symbolic model that fits the input-output data pair set, the symbolic model including a combination of at least one primitive operator and at least one data-driven operator whose parameters are learned.

11. The system of claim 10, wherein the set of primitive operators include mathematical operators, logical operators, and functions.

12. The system of claim 10, wherein the hardware processor is configured to train a data-driven operator of the data-driven operators.

13. The system of claim 10, wherein the hardware processor is configured to perform searching by a constrained optimization search with at least one predefined objective.

14. The system of claim 13, wherein the predefined objective includes a predefined accuracy objective.

15. The system of claim 13, wherein the predefined objective includes a predefined expression simplicity objective.

16. The system of claim 13, wherein the predefined objective includes a fidelity measure.

17. The system of claim 13, wherein the predefined objective includes an application specific constraint.

18. A computer program product comprising a computer readable storage medium having program instructions embodied therewith, the program instructions executable by a device to cause the device to:
receive a set of primitive operators;
receive a set of data-driven operators, at least one of the set of data-driven operators including a machine learning model;
receive an input-output data pair set; and
based on a grammar specifying rules for linking the set of primitive operators and the set of data-driven operators, search among the set of primitive operators and the set of data-driven operators to find a symbolic model that fits the input-output data pair set, the symbolic model including a combination of at least one primitive operator and at least one data-driven operator whose parameters are learned.

19. The computer program product of claim 18, wherein the set of primitive operators includes mathematical operators, logical operators and functions.

20. The computer program product of claim 18, wherein the device is caused to train a data-driven operator of the data-driven operators.

* * * * *